Aug. 20, 1957   D. M. LYNCH   2,803,504
SEGMENTAL TRACK
Filed Oct. 19, 1953   2 Sheets-Sheet 1
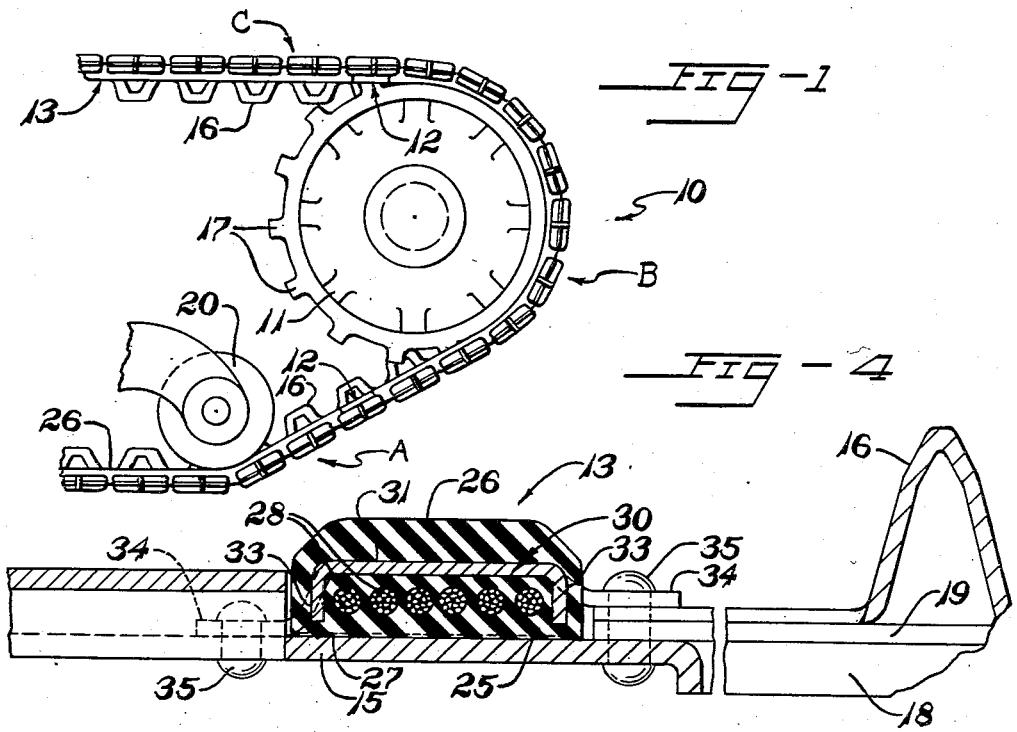
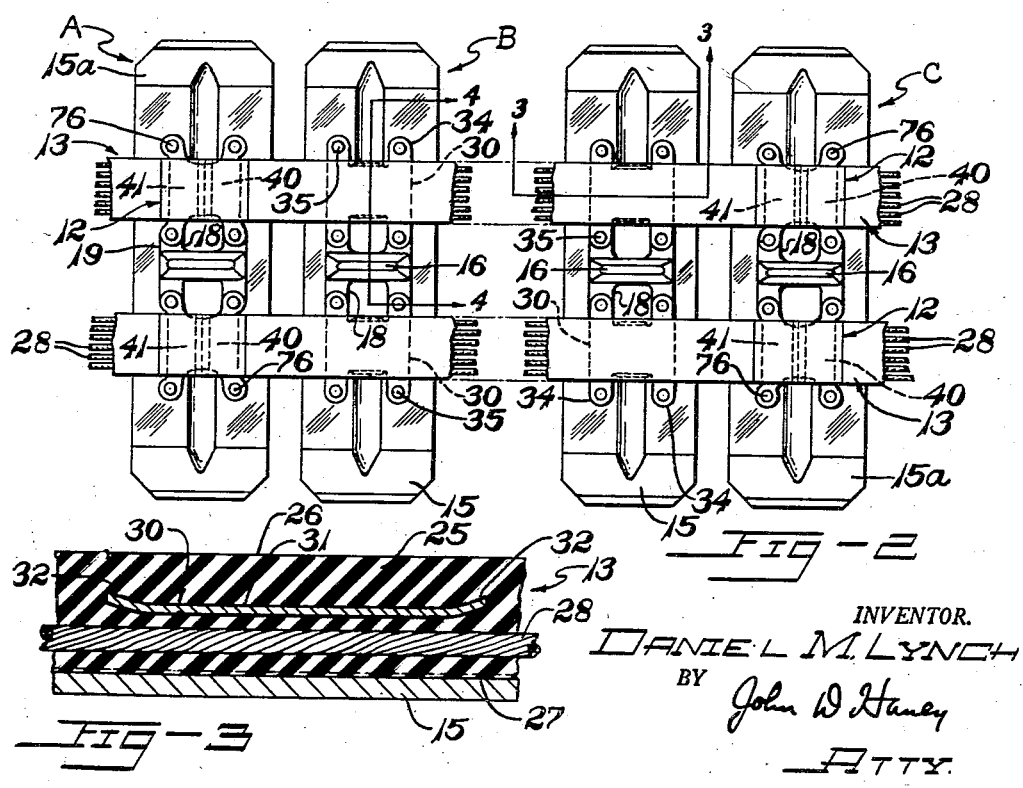
INVENTOR.
DANIEL M. LYNCH
BY John W. Haney
ATTY.

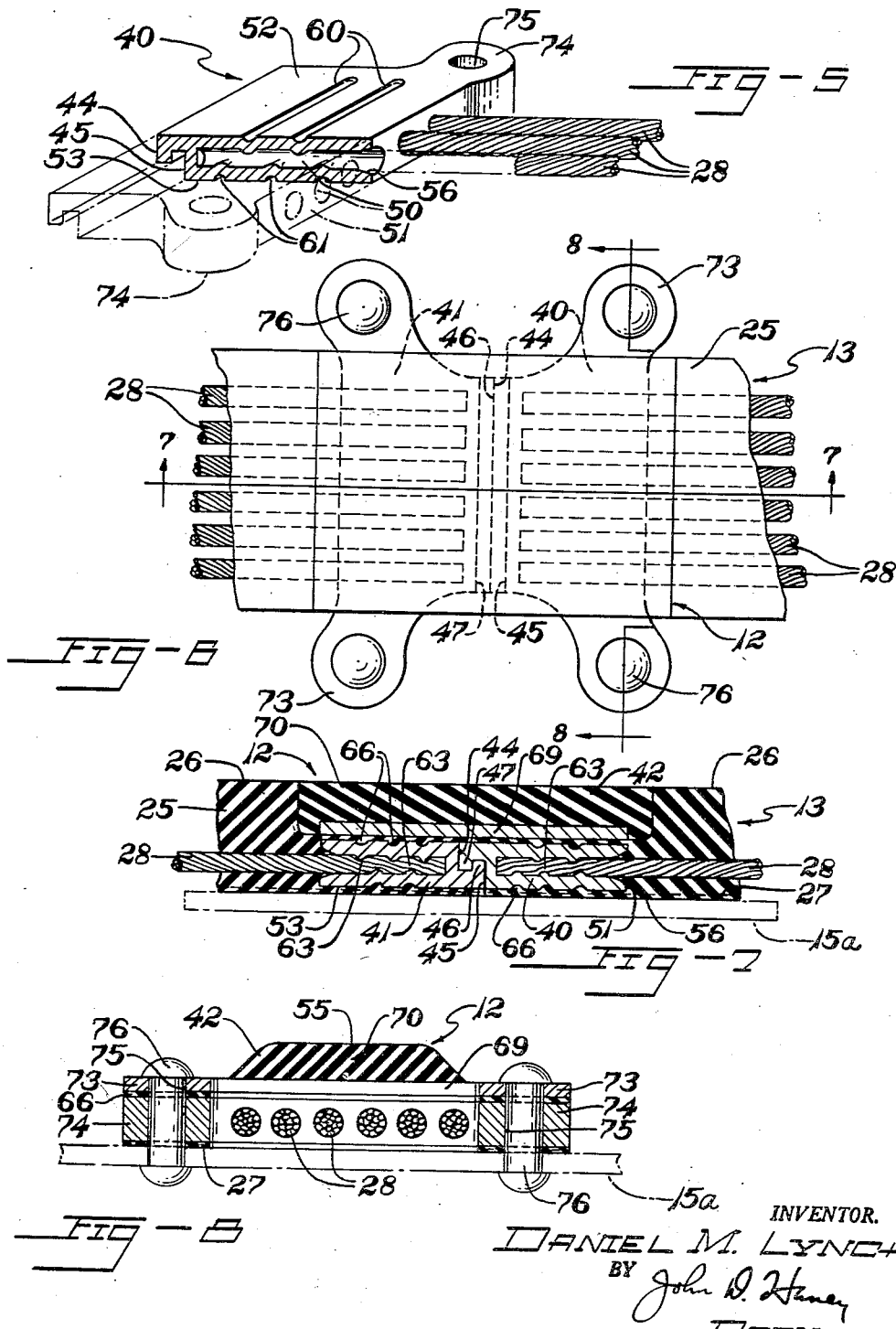

United States Patent Office 2,803,504
Patented Aug. 20, 1957

2,803,504

SEGMENTAL TRACK

Daniel M. Lynch, Akron, Ohio, assignor to The B. F. Goodrich Company, New York, N. Y., a corporation of New York Application October 19, 1953, Serial No. 386,796

12 Claims. (Cl. 305—10)

This invention relates to endless tracks for track-laying vehicles. More particularly the invention relates to endless tracks formed by coupling end-to-end one or more independent track segments, each including a flexible rubber body reinforced lengthwise with flexible metal tensioning members.

A general object of this invention is to provide a segmented track having a longer service life and a more simplified construction than those which have been proposed herebefore. This has been accomplished according to this invention principally by an improved mode of securing the ends of the reinforcing members of each track segment to members for coupling the segments together. The track structure of this invention is further characterized by an improved coupling device for joining the track segments into an endless track. The advantages resulting from these features include the fact that the driving loads are equally distributed among all of the reinforcing members of a segment; and that a continuous uninterrupted surface is provided on the rubber body at the junctures of the assembled segments on which the bogie wheels of the vehicle operate.

The invention will be further described with reference to the accompanying drawings which illustrate a preferred track structure constructed in accordance with and embodying the principles of this invention.

In the drawings:

Fig. 1 is a side elevation of a portion of an endless track shown trained about a driving sprocket and a bogie of a vehicle;

Fig. 2 is a plan view of a portion of the track showing the sprocket-engaging side of the track;

Fig. 3 is a cross-sectional detail view taken along the line 3—3 of Fig. 2 and drawn to an enlarged scale;

Fig. 4 is a cross-sectional detail view taken along line 4—4 of Fig. 2 and drawn to an enlarged scale;

Fig. 5 is a perspective view of one of the anchor plates of the segment, a portion of which is broken away and indicated in chain dotted lines;

Fig. 6 is an enlarged plan view of one of the joints at which the segments are coupled together;

Fig. 7 is a cross-sectional view taken along the line 7—7 of Fig. 6; and

Fig. 8 is a cross-sectional view taken along the line 8—8 of Fig. 6.

Referring to the drawings, Fig. 1 shows a track 10 trained around a driving sprocket 11 of a typical tracklaying vehicle. The track 10 is formed by assembling a number of individual track segments end-to-end such as the track segments A, B, and C of Fig. 2 and coupling these segments together by the coupling members 12.

Each track segment includes a pair of laterally-spaced tension bands 13 which extend lengthwise of the segment and to each of which is connected a plurality of groundengaging grousers 15 disposed transversely across the tension bands at closely-spaced intervals. Aligned along the longitudinal center of each segment intermediate the tension bands 13 is a series of upstanding guide elements 16 each of which is secured to a grouser as well as to each of the bands 13. When the track is trained around a driving sprocket as in Fig. 1, the guides 16 project radially into a groove (not shown) around the peripheral face of the sprocket 11 for maintaining the track in alignment with the sprocket. To drive the track lengthwise, the sprocket 11 is provided with pairs of driving teeth 17 which embrace the opposite sides of the guides 16 and fit into openings 18 in the grousers on opposite sides of the base of the guides to engage driving lugs 19 located on the grousers. The weight of the vehicle is supported by a number of bogie wheels such as the wheel 20 of Fig. 1, which wheels ride on the tension bands 13 as the track is driven lengthwise. The structure of the grousers 15, the guides 16, the openings 18, and driving lugs 19 may be advantageously the same as the corresponding parts of the track structure shown and described in the U. S. patent to C. O. Slemmons, No. 2,494,006.

The tension bands 13 of each track segment each include a rubber body 25 of uniform thickness throughout the length of the band having a smooth upper surface 26 on the sprocket-contacting side of the track along which the bogies 29 of the vehicle ride. The opposite side of the rubber body 25 to which the grousers 15 are mounted is reinforced with a rubber-covered fabric strip 27. The rubber body 25 completely surrounds and is vulcanized to a group of flexible metal-reinforcing members 28, which are shown in the drawings as being steel-stranded cables extending lengthwise through the body 25. There are six cables in each tension band and these are positioned in a common plane relatively close to the grouser-engaging side of the body in spaced parallel relation.

The grousers 15 are secured to their respective band portions by cross-plates 30 which are embedded in the body 25 of the band portions intermediate the ends of the bands at regularly spaced intervals. The shape of each of these cross-plates is brought out in Figs. 2–4. Each of these plates 30 has a generally flat center portion 31 which is above and parallel to the plane of the cables. Each end 32 of the center 31 (see Fig. 3) is flared gradually away from the cables so that the band portions may be flexed intermediate the plates 30 without having the end edges of the plates pinch or tend to bend the cables sharply. The plates 30 further include side flanges 33 (see Fig. 4) which extend downwardly from the flat center 31 near the sides of the band portions and cooperate to prevent the cables from becoming laterally separated from each other. At each of the four corners of the plates 30 there is a lug 34 which projects beyond the sides of the rubber body and to which the grousers 15 are secured by the fasteners 35. Those lugs 34 which are on the side of the plates 30 directed toward the guides 16 are also secured to the base of the guides 16 and the driving lugs 19 as well as to the grousers.

The opposite ends of each of the tension bands 13 of the track segments are provided with anchor plates 40 and 41, respectively, which together with a cover plate 42 (see Figs. 6–8) constitute the coupling members 12 by means of which the track segments are connected together.

The anchor plates 40 and 41 are each flat bars of malleable metal about half as thick as the rubber body 25 of the tension bands. The anchor plates 40 are identical in size and shape to the anchor plates 41 except that each anchor plate 40 has a downwardly directed hook member 44 formed along its rearward edge 45 (see Figs. 5 and 6) whereas each anchor bar 41 has an upwardly-directed hook member 46 along its rearward edge 47. These hook members are adapted to interlock with each other as shown in Fig. 7 when the track segments are coupled together.

Fig. 5 shows an anchor plate 40 (partly broken away) together with some of the cables 28 of a tension band 13 to illustrate the mode of securing the anchor plates to the cables. The anchor plate 40 in Fig. 5 extends transversely across the ends of the cables 28 and has a plurality of openings 50 of uniform depth which extend sideways into the plate from the forward edge 51 and terminate close to the rearward edge 45 of the plate. The openings 50 are parallel to the upper face 52 and lower face 53 of the anchor bar and they are spaced coaxially with the cables 28 so that they may receive the ends of the cables without bending or distorting the cables from the relative positions the cables occupy inside the rubber body. The openings 50 are initially formed in the plate 40 of such a size that the cable ends may be inserted manually into them and fit snugly. The mouth of each of the openings 50 close to the forward edge 51 is bell-shaped or widened as indicated by numeral 56 so that after the cables are inserted the mouths of the openings will not pinch the cables as they are flexed relative to the anchor plates.

To secure the anchor plate 40 to the ends of the cables 28, these ends are inserted into the openings 50 until the end of each cable abuts the bottom of its respective opening. Then the anchor plate together with the cables is inserted between a pair of pressure dies in a power press (not shown) and portions of the anchor plate in the areas 60 on the upper face 52 and in the areas 61 on the lower face 53 are swaged against the ends of the cables in the openings. As shown in Fig. 5 the swaged portions 60 and 61 are arranged parallel to each other, there being a pair of parallel swaged portions 60 in the upper face 52 offset intermediate the three parallel swaged areas 61 in the lower face 53. Thus the swaged portions 60 and 61 mutually cooperate to provide a corrugated gripping surface in each opening 50 on opposite sides of the cable ends. These swaged portions extend sideways across the anchor plate and since they may be all formed by a single stroke of a power press, all of the cables are gripped in identical manner and with the same degree of pressure. The swaging has the effect of deforming or coining the metal of the plate into the interstices of the strands of the cables. The cables are actually indented somewhat as indicated by numeral 63 in Fig. 7 and the portions of the cables displaced by the indentations are crowded into the spaces between the indentations to provide a locking effect between the indentations. Thus, there is a strong gripping effect along the length of the end of each cable even though the swaging is done only in the localized areas. A particular advantage of the localized swaging is that it does not cause any appreciable distortion of the outside overall dimensions of the anchor plate which would make it difficult to assemble the anchor plates together to couple the track segments.

The anchor plate 41 at the opposite ends of the cables 28 of each tension band 13 are secured to these ends of the cables in the manner identical as that described with respect to anchor plate 40 of Fig. 5.

To make a tension band 13, the cables 28 are first cut to the desired length with care being taken that each cable is the same length as each of the others of the band. The cables are then cleaned in a solvent such as trichloroethylene so that they are free of grease and other foreign materials. Then the ends of the cables are inserted into their respective anchor plates and the anchor plates are swaged to the ends of the cables as previously explained to form a metal skeleton of the band composed of the six cables 28 and the anchor plates 40 and 41. Next, this skeleton is suitably treated so that the rubber body 25 which is subsequently vulcanized to this skeleton will adhere to the metal parts. To accomplish this, preferably the skeleton is brass-plated and then dipped into a cement containing a major proportion of rubber which is subsequently allowed to dry. Thereafter unvulcanized rubber stock is assembled around the skeleton and the complete band structure vulcanized in a suitable mold. Since all of the cables of each band are simultaneously cleaned and treated, the resulting vulcanized bond between the cables and the rubber body is ordinarily more uniform among all of the cables than can be obtained when each cable is individually cleaned and treated prior to vulcanization. Further, since the length of all the cables is equal, the driving loads imposed on the cables when the track is in service will be equally distributed among all of the cables. This track is so designed that this advantageous result can be accomplished in assembly-line production of these tracks without extraordinary quality-control measures or precision workmanship. Ordinarily, the gripping power of the anchor plates on each cable 28 need not and usually does not exceed the tensile load the cable is capable of sustaining before fracture. Thus, should a condition arise where the driving loads are concentrated on one cable, the end of that cable may slip somewhat relative to the anchor plates to which it is connected and thus automatically equalize the excessive load by transferring some of it to the other cables.

The rubber body 25 is built up around the skeleton before vulcanization by laminating several strips of rubber together, with the skeleton and the intermediate plates 30 interposed between the several rubber strips. Preferably in building a tension band, the fabric layer 27 which is preferably bias, square-woven fabric with a friction coating of rubber on both sides is first laid along a trough, and on top of it are placed one or more layers of unvulcanized rubber stock. The metal skeleton consisting of the cables and the anchor members is then positioned on this lamination and thereafter additional layers of unvulcanized rubber are plied up on top of the cables. The cross-plates 30 are positioned at appropriately spaced positions on the latter layers of rubber and then additional layers of unvulcanized rubber are disposed over the plates 30 to form the body 25 to the desired thickness. The vulcanization of this lamination fuses the several rubber strips into an integral band bonded to the metal parts. Preferably the fabric strip 27 covers the lower side of the anchor plates 40 and 41 substantially as shown in Fig. 7. In addition, there is a relatively thin skin 66 of rubber which covers the upper faces 52 each of the anchor plates 40 and 41 to insulate these plates from the cover plate 42 and protect the anchor plates from moisture and corrosion.

It may be seen from Fig. 2 that anchor plates 40 are provided at the left ends of each of the tension bands 13 of track segments B, and track segment C. Similarly, anchor plates 41 are provided at the right ends of each of these tension bands. While the right ends of the tension bands of segment C are not illustrated, it will be understood that these ends will be formed the same as the right ends of the tension bands 13 of segment A which are shown. To couple the track segments together, the anchor plates 40 of one segment are fitted together with the corresponding anchor plates 41 of an adjoining section with the rearward edges 45 and 47 of the anchor plates abutting and the respective hook portions 44 and 46 interlocking at about the longitudinal center of a grouser 15a (see Figs. 2 and 7). Since the anchor plates are only about one-half as thick as the rubber body 25 of each band, there is a substantial opening above the anchor plates to receive the cover plate 42. The cover plate 42 includes a metal base 69 with a rubber portion 70 vulcanized to it with the upper surface of the rubber portion having the same cross-sectional contour as the upper portion of the rubber body of the bands and equal in length to the opening between the rubber bodies 25 above the anchor plates of the assembled bands. The metal base 69 overlies and covers substantially the complete area of the upper surface 52 of both anchor plates 40 and 41. The ends of the rubber portion 70 of the cover plate abut the end surfaces of the rubber bodies 25 so that the upper surface of the portion 70 bridges between the surfaces 26 of the adjoining tension bands to provide a substantially smooth uninterrupted surface above the anchor plates on which the bogies 20 may roll when the track is in operation.

The metal base 69 of the cover plate 42 has a lug 73 projecting from each of its four corners, which overlie and register with each similarly-shaped lug 74 at each side of the anchor plates 40 and 41. These lugs 73 and 74 have registering apertures 75 to receive a fastener such as the rivet 76 which extends through each registering aperture and through the grouser 15a substantially as shown in Fig. 8. The cover plates 42 preclude dirt and stones and the like from penetrating into the bands around the anchor plates and causing the rubber body 25 to separate from the cables 28. In addition, the cover plates and the grousers 15a cooperate with the interlocking hook members of the anchor plates of each band to transfer the driving loads from one segment to the adjoining segment, the cover plate and grouser each sustaining tension loads in accomplishing this function.

The tension bands 13 of these segments may be used with a variety of different style grousers, guides. The track segments may include more than two of the tension bands 13 although an even number of tension bands will ordinarily be used in a track segment which has sprocket guides located at the center of the track such as the guides 16. The track segments may be made up in any desired length, and as many track segments as desired may be assembled end-to-end to provide an endless track. In fact, a complete track may be formed by coupling the ends of a single track segment together. Ordinarily, each track segment including the tension bands 13, together with grousers 15 attached to them and the guides 16 and other miscellaneous elements will be made manufactured as a unit. Thus, if a particular segment of a track assembled from these segments becomes worn or damaged in service, this segment may be easily replaced.

Variations of the preferred form of the invention may be made within the scope of the appended claims.

I claim:

1. A track for track-laying vehicles comprising tension bands disposed longitudinally of the track, and ground-engaging grousers on said bands, the tension bands each having a plurality of flexible metal cables extending lengthwise of the band in a common plane and in spaced parallel relation to each other, an anchor plate at each end of each band disposed transversely to the ends of said cables in the plane of the cables, each anchor plate being swaged to all of the ends of the cables at its respective end of the band, and a rubber body surrounding said cables intermediate the anchor members and being thicker than the thickness of said anchor plates, adjoining tension bands fitting together end-to-end with a rearward edge of an anchor member of one band abutting a corresponding edge of an anchor member of an adjoining band, and a cover plate fitting against each pair of abutting anchor members and having a portion of rubber bridging between the respective rubber bodies of adjoining bands to provide a continuous rubber surface between the surfaces of rubber bodies of the adjoining bands.

2. A track for track-laying vehicles comprising tension bands disposed longitudinally of the track; ground-engaging grousers on said bands; the tension bands each having a plurality of flexible metal cables extending lengthwise of the band in a common plane and in spaced parallel relation to each other, a single anchor plate at each end of each band disposed transversely to the ends of said cables in the plane of the cables, a plurality of openings extending sideways into each anchor plate from an edge thereof directed toward the cables into each of which openings an end of one of the cables projects in coaxial alignment with the portions of the cables intermediate said anchor plates, portions of each anchor plate extending transversely across all of said openings being swaged against the ends of said cables, and a rubber body thicker than said anchor plates surrounding said cables intermediate the anchor plates of each band; adjoining tension bands fitting together end-to-end with a rearward edge of an anchor plate of one band substantially abutting a corresponding edge of an anchor plate of an adjoining band; and a cover fitting against said abutting anchor plates and having a portion of rubber bridging between the respective rubber bodies of adjoining bands to provide a continuous rubber surface between the surfaces of the rubber bodies of the adjoining bands.

3. A track for track-laying vehicles comprising a series of substantially flat tension bands disposed longitudinally of the track, the tension bands each having a plurality of flexible metal reinforcing members extending lengthwise through the band in a common plane, a body of rubber surrounding said reinforcing members and having a smooth exterior surface parallel to the plane of said tension members, and a flat anchor plate at each end of the band disposed transversely to the ends of said reinforcing members and in the plane of said members and being swaged to the ends of all of said reinforcing members, adjoining tension bands fitting together end-to-end with an anchor plate of one band abutting an anchor plate of an adjoining band to space apart said exterior surfaces of the respective rubber bodies of the adjoining bands, and a cover fitting against said abutting anchor plates and having a portion of rubber with an exterior surface bridging between said surfaces of the adjoining bands to provide a continuous rubber surface above said abutting anchor members.

4. A tension band for a segmented track comprising a pair of generally flat anchor plates each having a pair of opposed flat faces on opposite sides of the plate and a plurality of openings extending into the plate parallel to said faces from one edge of the plate, a plurality of flexible metal cables of equal length extending between said anchor plates with the ends of the cables extending into said openings of each anchor plate in coaxial alignment with the portion of the cables intermediate the anchor plates, one of said flat faces of the anchor plate having a pair of spaced-apart parallel portions extending transversely to all of said openings and deformed against the ends of the cables in said openings, and the other of said flat faces of the anchor plate having a portion located intermediate said deformed portions on the opposite face deformed against the cables in said openings, a rubber body enclosing and surrounding said cables intermediate the anchor plates, means engaged with said rubber body intermediate the anchor plates for connecting track members to the body, and a ply of rubber-covered fabric covering one face of each anchor plate and an outside surface of the rubber body.

5. A track for track-laying vehicles comprising tension bands connected end-to-end, each tension band comprising a body of rubber material, a single integral anchor plate at each end of the body, and a plurality of flexible metal reinforcing members extending from one of said anchor plates longitudinally through said body to the other anchor plate at the opposite end of the body, each anchor plate being swaged against all of the ends of the reinforcing members terminating adjacent it so that all of the ends of the reinforcing members are collectively secured to the anchor plate, and means coupling the anchor plates of adjoining tension bands to connect the bands longitudinally of each other.

6. A track for track-laying vehicles comprising tension bands connected end-to-end, each tension band comprising a plurality of flexible metal cables extending lengthwise of the band in a common plane and in laterally spaced parallel relation to each other, a single integral anchor plate at each end of the band transversely confronting all of the ends of said cables at its respective end of the band and having a plurality of openings into each of which an end of one of the cables projects in coaxial alignment with the portions of the cable remote from the anchor plate, and each anchor plate being deformed to constrict each of said openings against the ends of the cables in said openings so that all of the ends of the cables are collectively gripped by said anchor plate, a rubber body surrounding said cables throughout the length of the band, and means projecting from an anchor plate of one of the bands to overlap an anchor plate of an adjoining band for coupling adjoining bands to each other.

7. A track for track-laying vehicles comprising a first series of tension bands disposed lengthwise of the track, and a second series of tension bands also disposed longitudinally of the track in laterally spaced parallel relation to said first series, means extending transversely between said first and second series of bands for laterally interconnecting the bands, each tension band having a plurality of flexible metal cables extending lengthwise through the band in a common plane and in spaced parallel relation to each other, a rubber body surrounding and vulcanized to the cables, and a single integral anchor plate at each end of each band, each anchor plate embracing all of the ends of the cables at its respective end of the band and being deformed into pressure engagement with said ends of the cables so that all of said ends of the reinforcing members are collectively secured to the anchor plate, and means coupling anchor plates of adjoining tension bands of each series to connect the bands of each series end-to-end.

8. A track segment comprising a pair of tension bands disposed longitudinally of the segment, means extending transversely of the segment for maintaining said tension bands in spaced parallel relation, each tension band comprising a plurality of flexible metal cables extending lengthwise through the band in a common plane in spaced parallel relation to each other and of uniform length, a single anchor plate at each end of the band disposed transversely to the ends of the cables in the plane of the cables and swaged to the ends of all of the cables to grip all of said ends collectively, the anchor plates being adapted for coupling with similar anchor plates on other track segments, and a rubber body surrounding said cables throughout the length of each band.

9. A tension band for a segmented track comprising a rubber body of substantially uniform thickness throughout its length, a plurality of flexible metal reinforcing members extending lengthwise through the rubber body in a common plane and all of uniform length, and at each end of the band a single anchor plate embracing all of the ends of the reinforcing members at its respective end of the band and the anchor plate being deformed against all of said ends of the reinforcing members so that the reinforcing members are collectively secured to the anchor plate.

10. A tension band for a segmented track comprising a pair of generally flat anchor plates each having a pair of opposed flat faces on opposite sides of the plate and a plurality of openings extending into the plate parallel to said faces from one edge of the plate, a plurality of flexible metal cables all of equal length extending between said pair of anchor plates with one end of each cable extending into an opening of one of the plates and the opposite end of said cable extending into a corresponding opening in the other of said plates, portions of each of said flat faces of each anchor plate above and below the cables and other portions of each of said faces extending transversely to all of said holes intermediate the cables being deformed toward the corresponding portions of the opposite faces of the anchor plate to provide gripping engagement of each anchor plate with all of the cables, and a rubber body surrounding the portion of the cables intermediate said anchor plates.

11. A metal skeleton for sustaining driving loads in a tension band of a track comprising a pair of anchor plates each having upper and lower faces on opposite sides thereof and having a plurality of parallel spaced openings extending into the plate intermediate said faces from one edge of the plate, and a plurality of flexible metal cables of uniform length extending between said pair of anchor plates with the ends of each cable extending into said openings of each anchor plate, and portions of said faces of each anchor plate being deformed to constrict said openings against the ends of the cables positioned therein to provide gripping engagement of the anchor plate with the ends of the cables so that the cables are secured collectively to each anchor plate.

12. A metal skeleton for sustaining driving loads in a tension band of a track comprising a pair of generally flat anchor plates each having a pair of opposed flat faces on opposite sides of the plate and a plurality of parallel spaced openings extending into the plate parallel to said faces from one edge of the plate, and a plurality of flexible metal cables of uniform length extending between said pair of anchor plates with the ends of each cable extending into said openings of each anchor plate, one of said flat faces of each anchor plate having a pair of spaced-apart parallel portions extending transversely to all of said openings and deformed against the ends of the cables in said openings, and the other of said flat faces of each anchor plate having a portion located intermediate said deformed portions on the opposite face also deformed against the cables in said openings to provide gripping engagement of the anchor plates with the ends of the cables.

References Cited in the file of this patent

UNITED STATES PATENTS

| | | |
|---|---|---|
| 2,062,986 | Baxter | Dec. 1, 1936 |
| 2,338,819 | Mayne | Jan. 11, 1944 |
| 2,387,802 | Mayne | Oct. 30, 1945 |
| 2,410,507 | Knight | Nov. 5, 1946 |